UNITED STATES PATENT OFFICE.

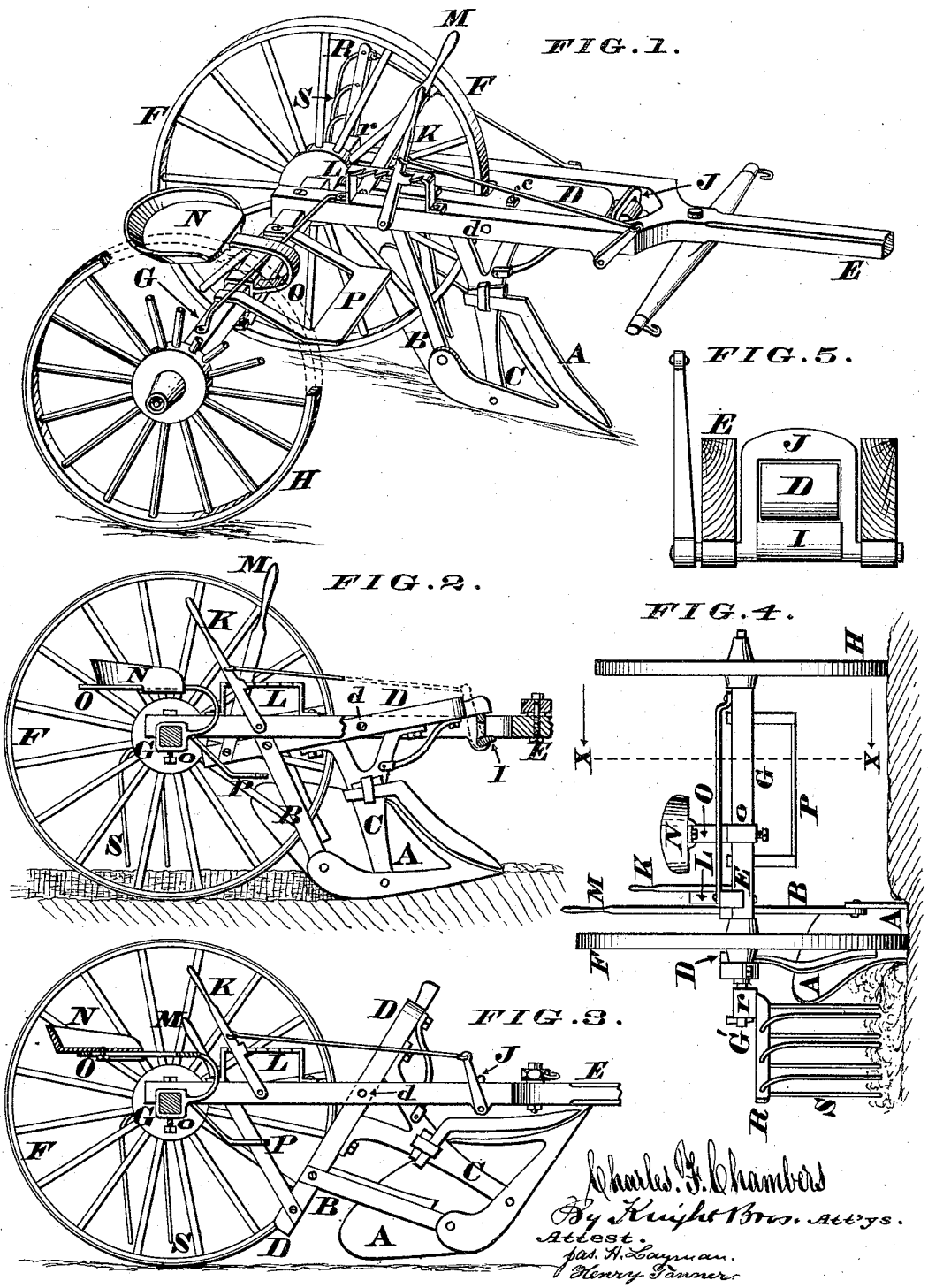

CHARLES F. CHAMBERS, OF HUTSONVILLE, ILLINOIS.

IMPROVEMENT IN PLOWS.

Specification forming part of Letters Patent No. 157,372, dated December 1, 1874; application filed October 16, 1874.

*To all whom it may concern:*

Be it known that I, CHARLES F. CHAMBERS, of Hutsonville, Crawford county, Illinois, have invented a new and useful Plow, of which the following is a specification:

My invention relates to improvements in the common riding or sulky plow, which enable the husbandman to regulate the pitch, or, if desired, to unearth the share, to ease and regulate the draft, &c.

In the accompanying drawing, Figure 1 is a perspective view of a machine embodying my invention, portions of the smaller ground-wheel being broken away. Figs. 2 and 3 are sections in the line $x\ x$, which respectively represent the share up-pitched for unearthing, and fully elevated for traveling. Fig. 4 is a rear view of my plow in its working condition. Fig. 5 is a transverse section, on a larger scale, of the bifurcated tongue, the point of the beam and its confining yoke being shown in elevation.

The share A may have the represented or any approved or customary form employed for breaking up ground. Said share is connected by means of suitable bars or sheaths B C, with the beam D, which occupies the bifurcated rear portion of the tongue E, to which it is secured by pivot $d$, and has its rear portion likewise bifurcated to receive the front part of wheel F, whose axle G is journaled to the rear end of the tongue. The said wheel is so located, with reference to the shares in the working position of the latter, as to run in rear of the share in the groove or furrow made thereby, and is of such diameter as to extend somewhat deeper than the share-bar, so as to take the main stress off of the rear portion of the share. The wheel H, on the other extremity of the axle, being that which is located in the land-side of the plow, is as much smaller in radius than the furrow-wheel F as the depth of the furrow. The two wheels coact to prevent any careening of the plow, and the larger wheel F performs the additional service, in conjunction with the upward or downward dip of the beam, of holding the plow in its proper uniform depth and pitch in the ground. Slots $c$, either in the beam D or in the top flanges of the sheaths, may be provided to enable the setting of the share either in or out of land. Pivoted athwart the beam is a combined cam, I, and yoke J, which, in the working condition of the implement, receives the point of the beam and holds the same at the desired upward or downward inclination or pitch, according as the handle K is moved backward and forward; or by pushing the handle K forward until the yoke J clears the beam, the point of the latter may be uptipped, as in Fig. 2, so as to rest upon the top of the yoke, thereby pitching the share sufficiently upward to unearth the same. The handle K, and thereby the yoke J, are held to any desired adjustment by a rack, L, which projects from the tongue. A handle, M, which projects upward from the rear end of the beam, enables the driver, without leaving his seat, to adjust the beam to any of the above positions, or even to the position shown in Fig. 3, in which the share is thrown entirely clear of the ground, so as to enable the implement to be driven, like an ordinary buggy, from place to place. The part of the axle which intervenes between the wheels is of square or other non-circular form. N is the driver's seat, securely retained to, while capable of being slid forward or backward upon, the leg O, whose lower extremity is a sleeve, $o$, which closely embraces the axle, but which is also capable of being slid to right or left along it.

The capacity of the seat to be sifted forward or backward, and also to the right or to the left, enables the weight of the driver to be located, so as to balance the machine, and at the same time to relieve the team from unnecessary load and to avoid side draft.

A step or foot rest, P, depends downward and forward from the axle. This step may either slide with the seat, or be, as here represented, an immovable projection from the axle. The axle has a non-circular extension, G′, outside of the wheel F, for the corresponding socket $r$ of the head R of a harrow or clod-fender, S. The said head, standing with a slight obliquity backward, permits the escape to one side of matters not pulverized by the harrow.

The teeth of the clod-fender may be removable or adjustable, and the entire fender may be taken off when no longer needed.

The double-tree may be applied under the tongue, as in Fig. 1, or over it, as in Fig. 2, according as it may be desired to give upward or downward pitch, or to place less or more weight upon the team.

The means here provided for unearthing the plow and again of lowering its pitch to any desired extent, enables the plow to be turned around at the end of a through and re-entered without disturbing the headland.

I claim—

1. A sulky-plow, whose plow proper, A B C D, is pivoted in the bifurcated tongue E, and the point of whose plow-beam D is capable of being secured in the cam-yoke I J.

2. The plow-proper A B C D, whose beam is bifurcated to receive a furrow-wheel, F, operating in rear of the share, and is contained in and pivoted to the bifurcated tongue E.

3. In a sulky-plow, the combination of the tongue E and beam D, each bifurcated to receive the furrow-wheel F, with the extension-axle G', and the harrow R S, on the furrow side, as and for the purposes set forth.

In testimony of which invention I hereunto set my hand.

C. F. CHAMBERS.

Witnesses:
GEO. H. KNIGHT,
O. P. CAYLOR.